US012625022B2

(12) United States Patent
Sato

(10) Patent No.: US 12,625,022 B2
(45) Date of Patent: May 12, 2026

(54) SEMICONDUCTOR PRESSURE SENSOR AND MANUFACTURING METHOD THEREFOR

(71) Applicant: Mitsubishi Electric Corporation, Tokyo (JP)

(72) Inventor: Kimitoshi Sato, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1015 days.

(21) Appl. No.: 17/216,784

(22) Filed: Mar. 30, 2021

(65) Prior Publication Data

US 2022/0011186 A1 Jan. 13, 2022

(30) Foreign Application Priority Data

Jul. 7, 2020 (JP) ................................. 2020-116796

(51) Int. Cl.
G01L 9/00 (2006.01)

(52) U.S. Cl.
CPC .......... G01L 9/0042 (2013.01); G01L 9/0054 (2013.01)

(58) Field of Classification Search
CPC ............................ G01L 9/0042; G01L 9/0054
See application file for complete search history.

(56) References Cited

U.S. PATENT DOCUMENTS 4,852,581 A 8/1989 Frank
5,335,550 A * 8/1994 Satou .................... G01L 9/0054
29/621.1

2005/0274191 A1* 12/2005 Hasegawa ............. G01P 15/123
73/721
2010/0140725 A1* 6/2010 Getman ................ G01L 9/0042
257/419
2011/0214505 A1 9/2011 Aoki et al.
2011/0278685 A1 11/2011 Yoshikawa et al.
2013/0193531 A1 8/2013 Nishikawa et al.

(Continued)

FOREIGN PATENT DOCUMENTS

DE 38 77 170 T2 4/1993
DE 42 23 455 A1 10/1993

(Continued)

OTHER PUBLICATIONS

Merriam Webster OnLine Dictionary Definition of "Essential." No Date.*

(Continued)

*Primary Examiner* — Nathan W Ha
(74) *Attorney, Agent, or Firm* — Studebaker Brackett PLLC

(57) ABSTRACT

A semiconductor pressure sensor according to the present disclosure includes: a first silicon substrate; a first silicon oxide film provided on the first silicon substrate and forming a closed space together with the first silicon substrate; a second silicon substrate provided on the first silicon oxide film; a gauge resistor provided on a surface layer of a surface of the second silicon substrate opposite to a surface on which the first silicon oxide film is provided at a position overlapping with the closed space in a plan view; a first electrode electrically connected to one end of the gauge resistor; and a second electrode electrically connected to another end of the gauge resistor.

7 Claims, 24 Drawing Sheets

(56) References Cited

U.S. PATENT DOCUMENTS

| | | | |
|---|---|---|---|
| 2014/0084395 A1* | 3/2014 | Sparks | B81C 1/00158 |
| | | | 257/416 |
| 2015/0217989 A1 | 8/2015 | Matsuzawa | |
| 2018/0120184 A1 | 5/2018 | Yoshikawa | |
| 2019/0273200 A1 | 9/2019 | Sato | |

FOREIGN PATENT DOCUMENTS

| | | |
|---|---|---|
| DE | 10 2007 010 913 A1 | 9/2008 |
| JP | S54-162491 A | 12/1979 |
| JP | 2011094967 A | 5/2011 |
| JP | 2011-164057 A | 8/2011 |
| JP | 2011-237364 A | 11/2011 |
| JP | 2013-156061 A | 8/2013 |
| JP | 2015145801 A | 8/2015 |
| JP | 2016-099302 A | 5/2016 |
| JP | 2017-133944 A | 8/2017 |
| JP | 2018-072229 A | 5/2018 |
| JP | 2019152568 A | 9/2019 |

OTHER PUBLICATIONS

An Office Action; "Notice of Reasons for Refusal," mailed by the Japanese Patent Office on Jul. 25, 2023, which corresponds to Japanese Patent Application No. 2020-116796 and is related to U.S. Appl. No. 17/216,784; with English language translation.

An Office Action issued by the German Patent and Trademark Office on Dec. 19, 2022, which corresponds to German Patent Application No. 102021113242.8 and is related to U.S. Appl. No. 17/216,784; with English language translation.

An Office Action mailed by China National Intellectual Property Administration on Jun. 28, 2024, which corresponds to Chinese U.S. Appl. No. 17/216,784.4 and is related to U.S. Appl. No. 17/216,784; with English language translation.

* cited by examiner

F I G. 1
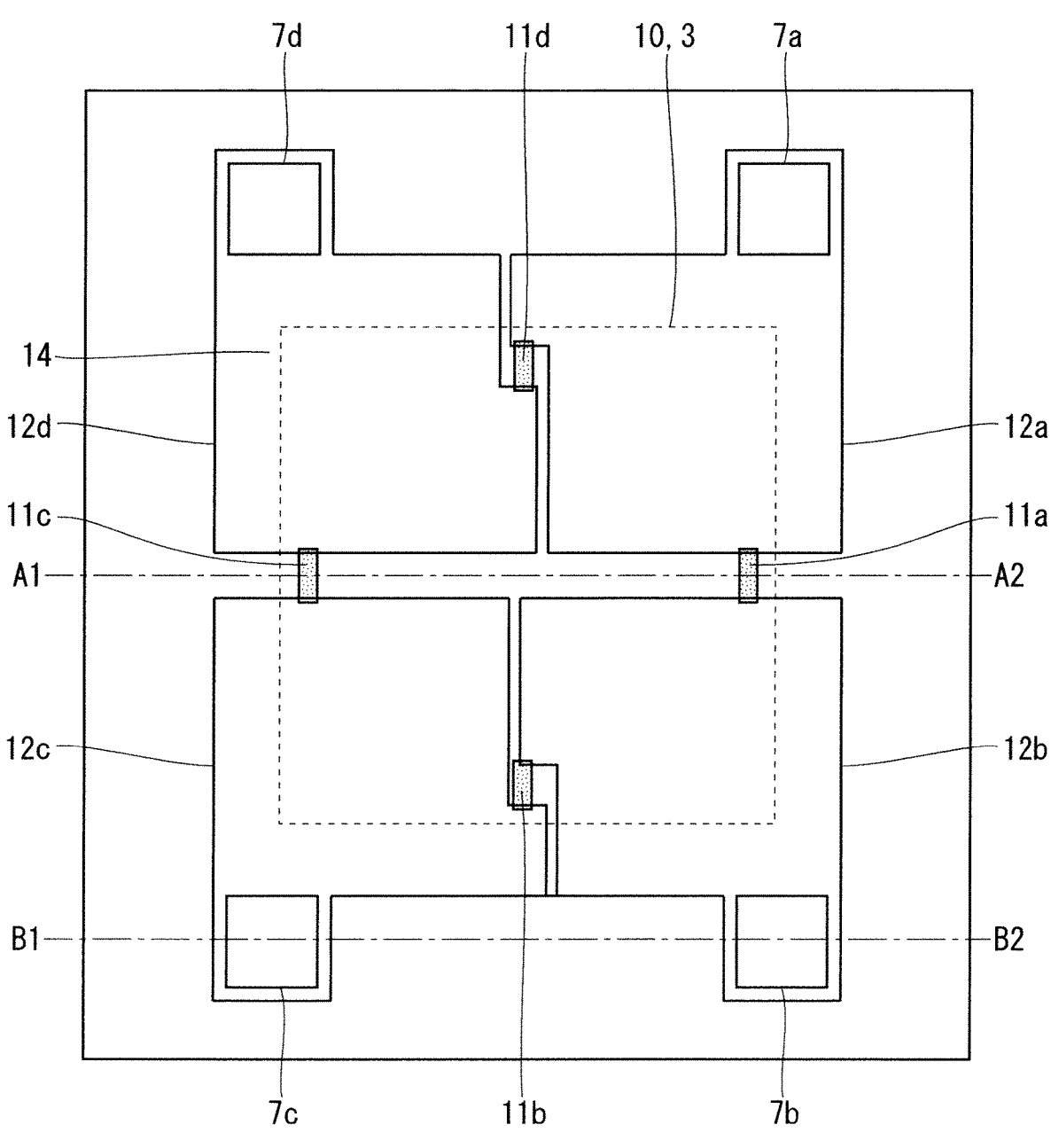

F I G. 2
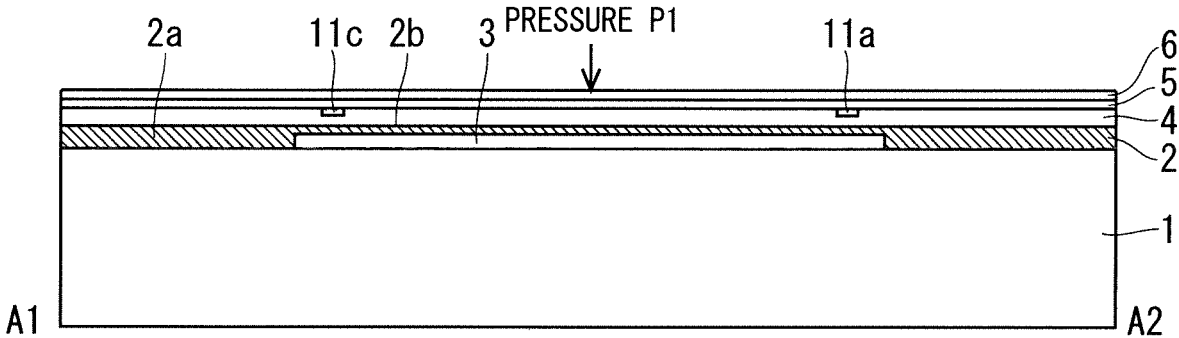
F I G. 3
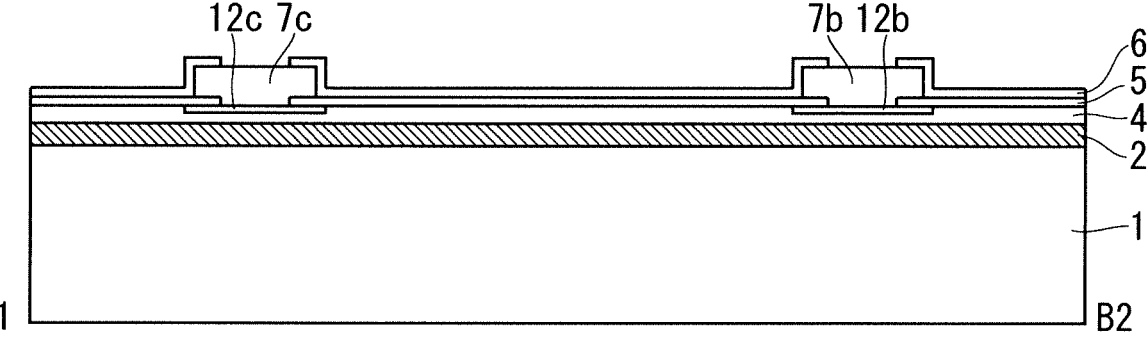

F I G.  4
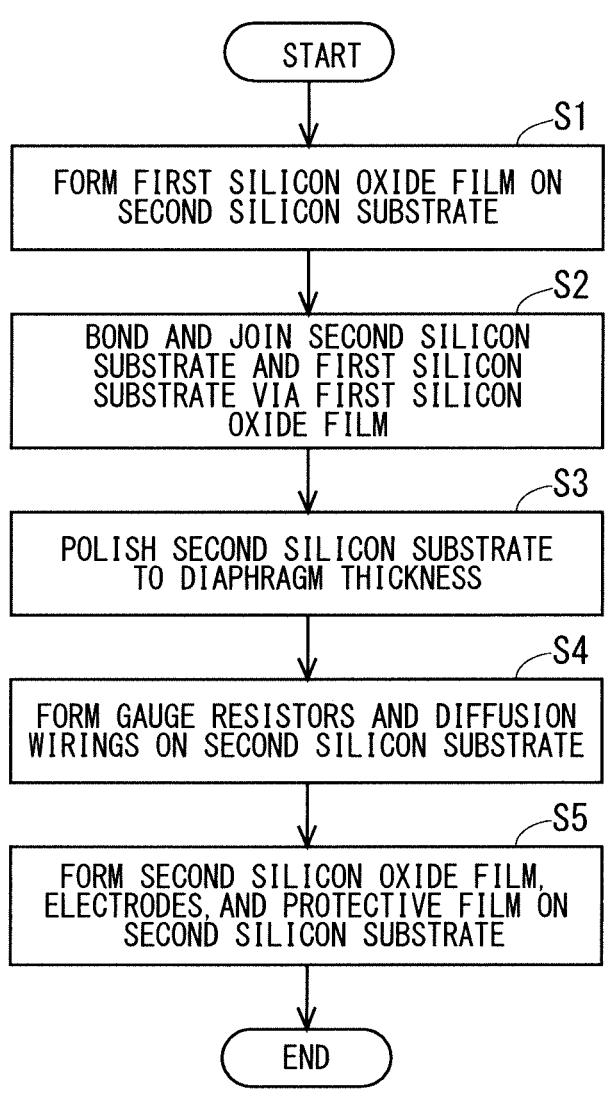

F I G. 5
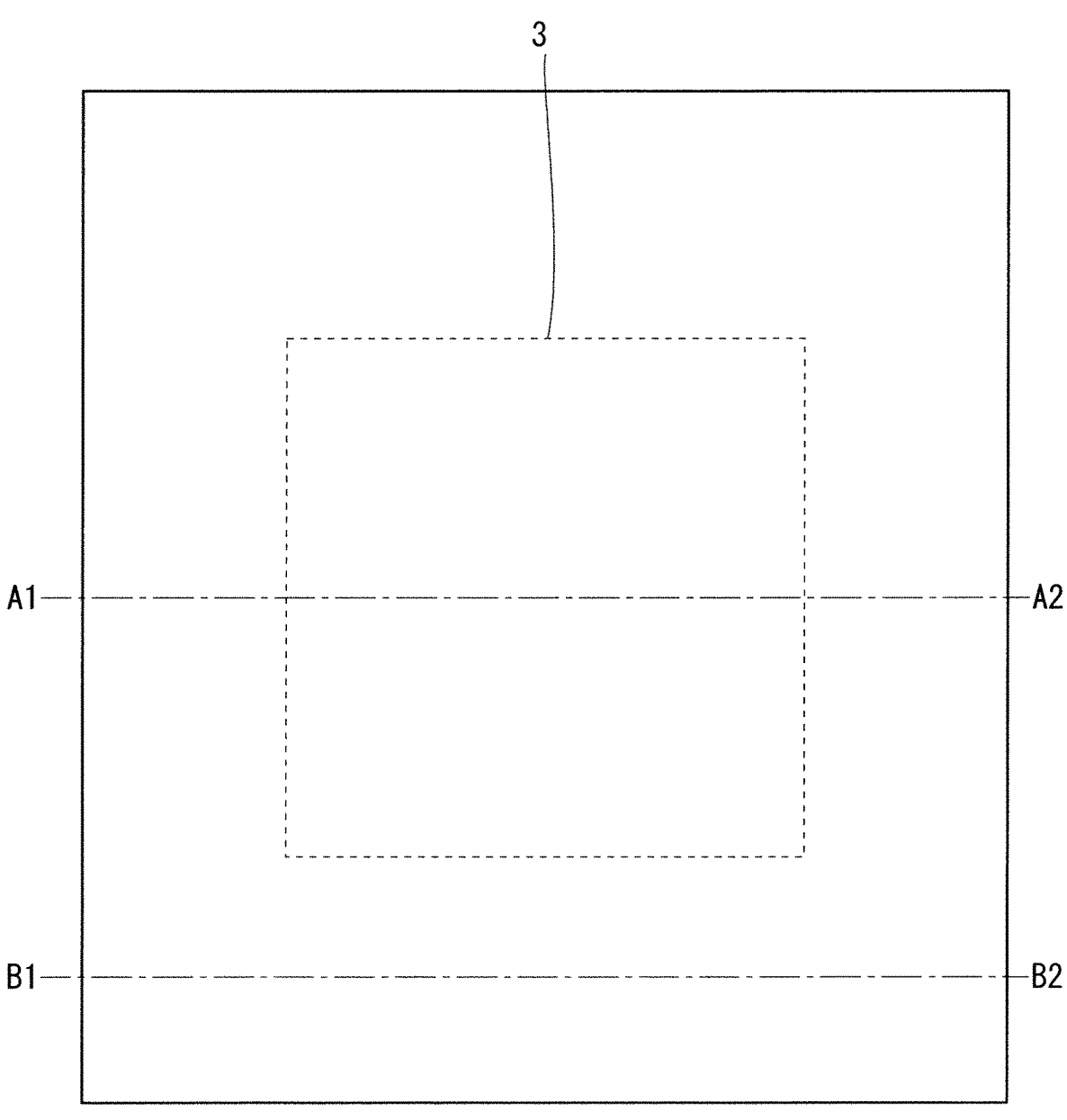

F I G.  6
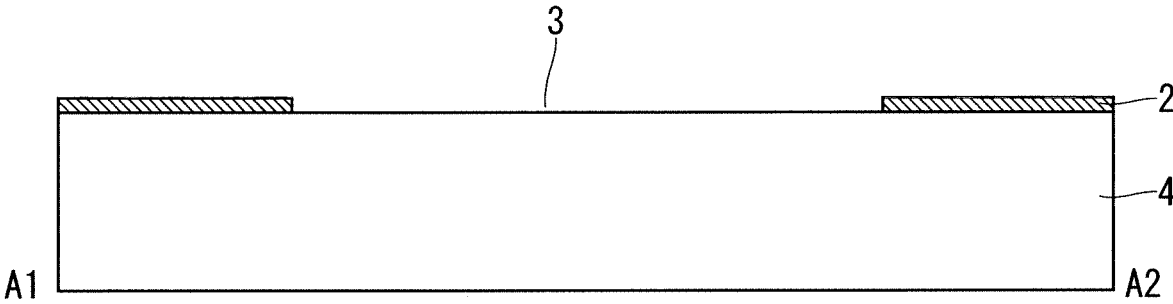
F I G.  7
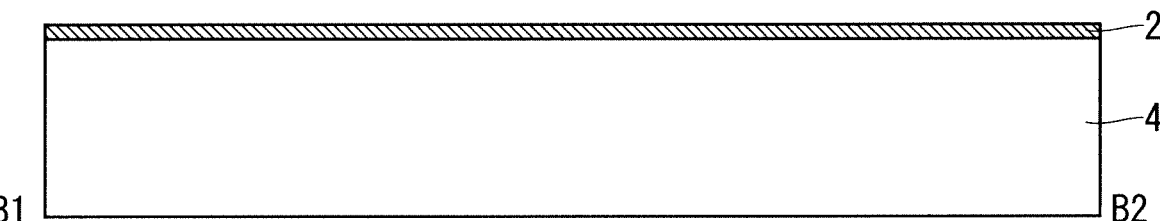

F I G.  8
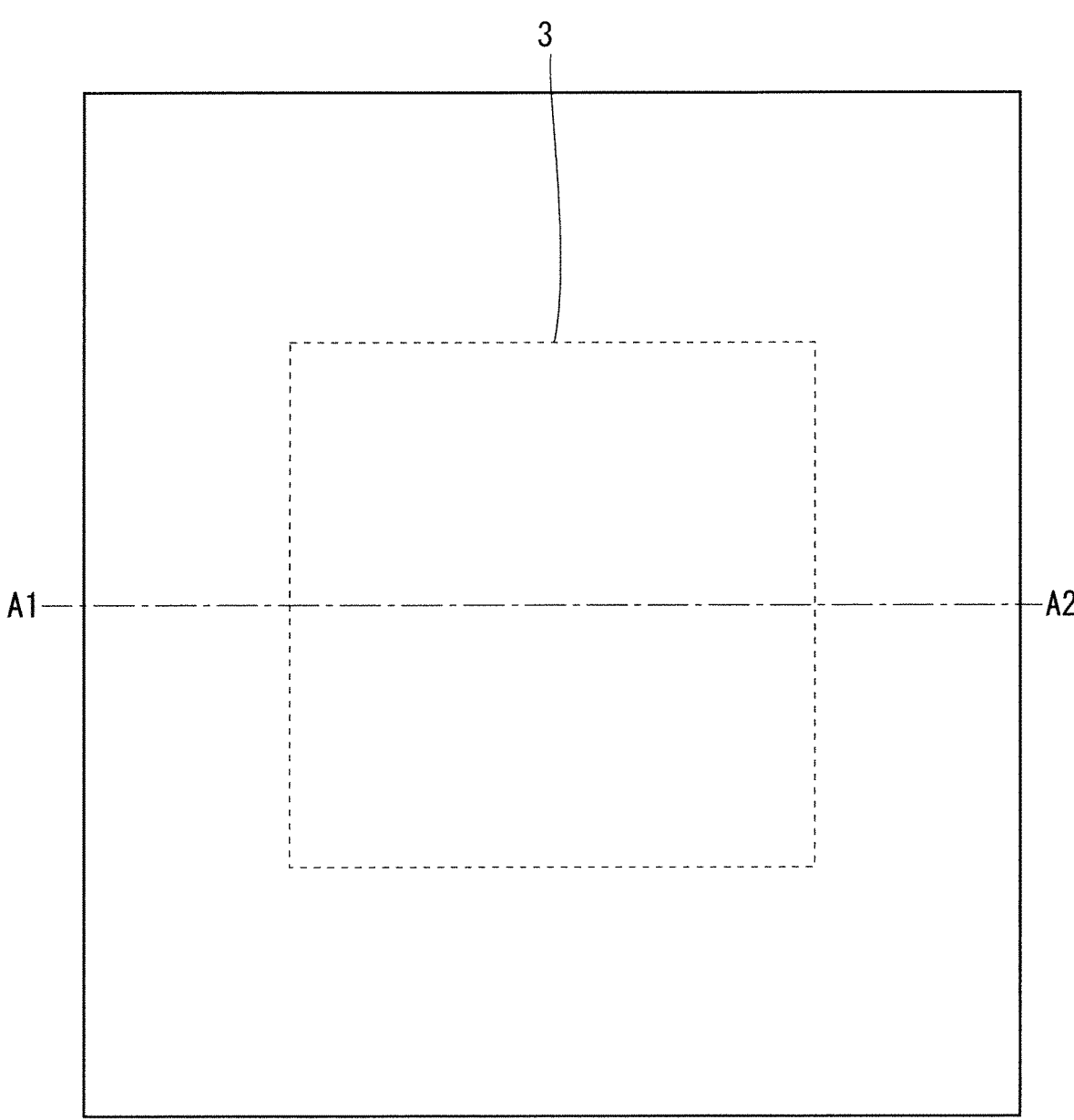

F I G. 9
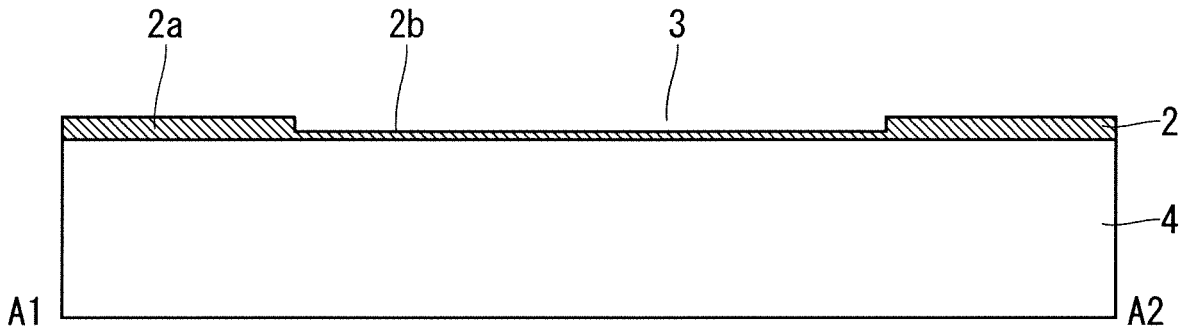

F I G.　1 0
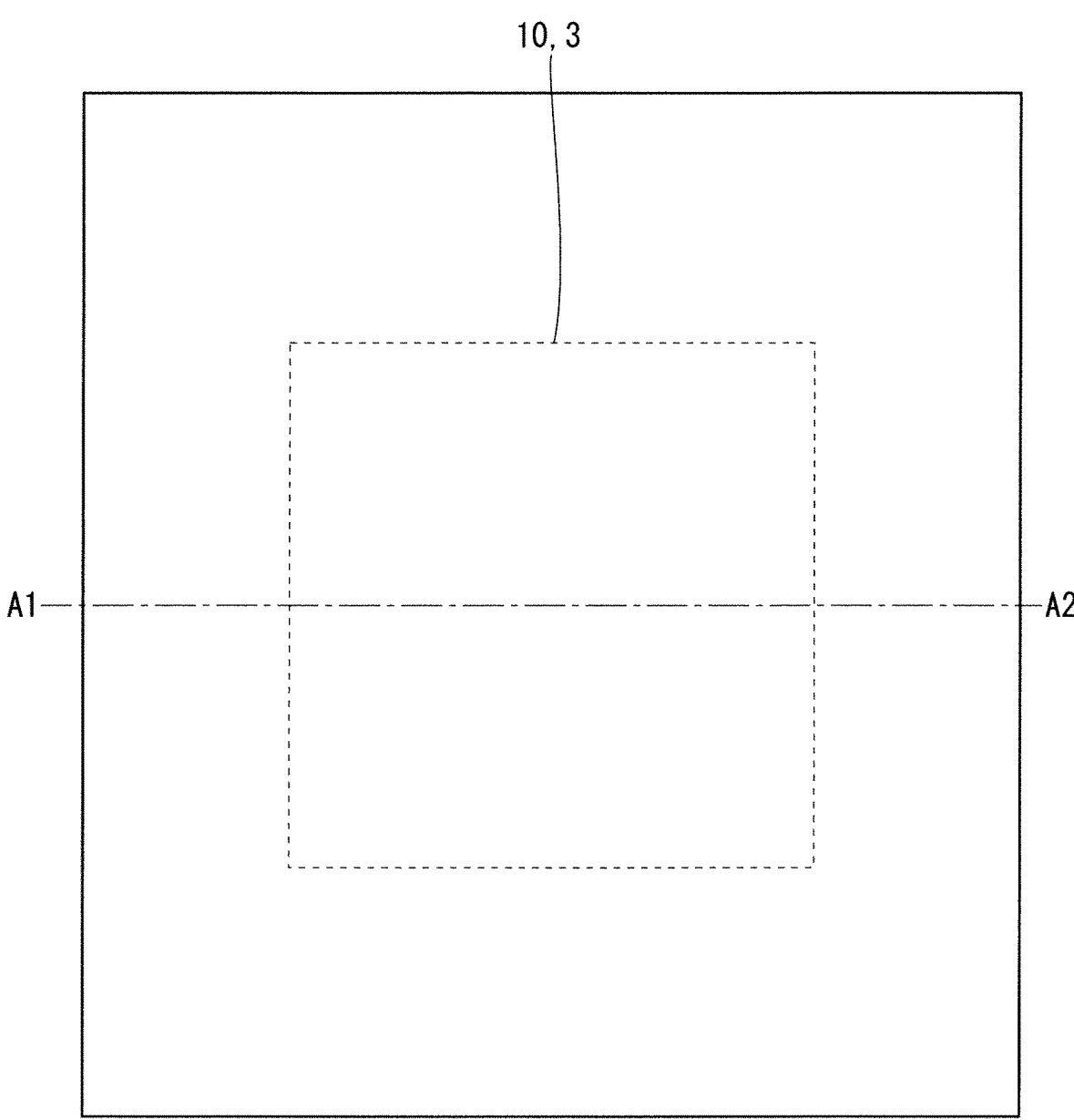

F I G.  1 1
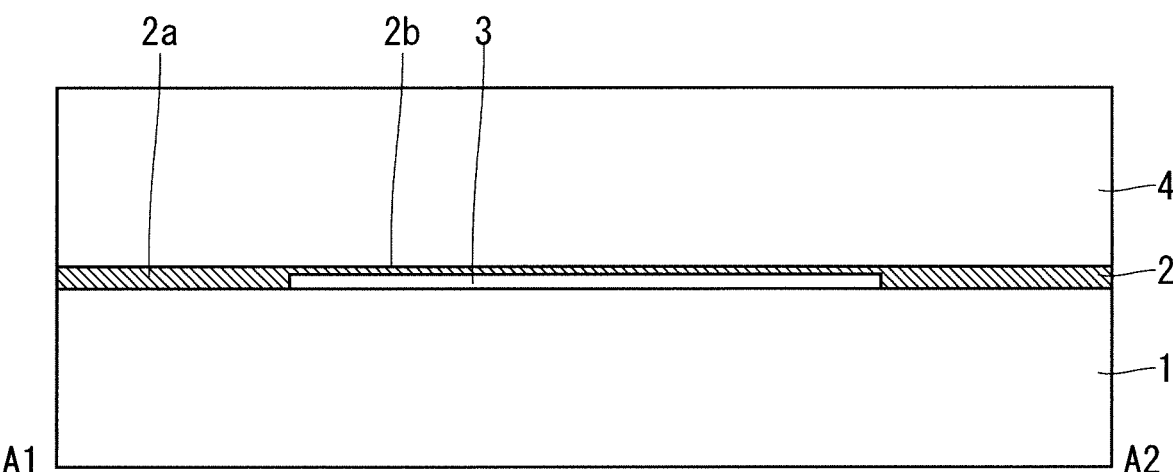

F I G .  1 2
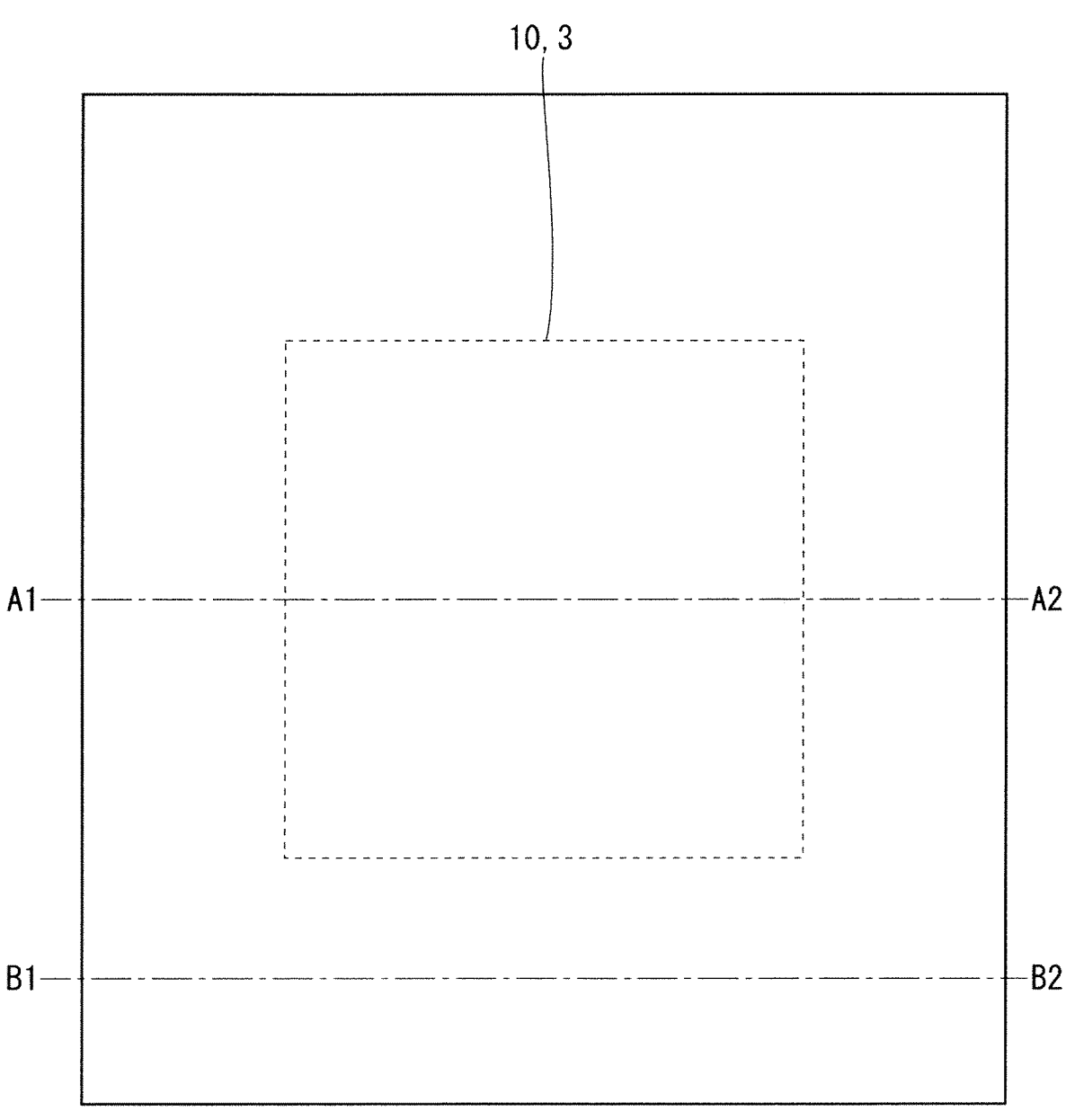

F I G. 1 3
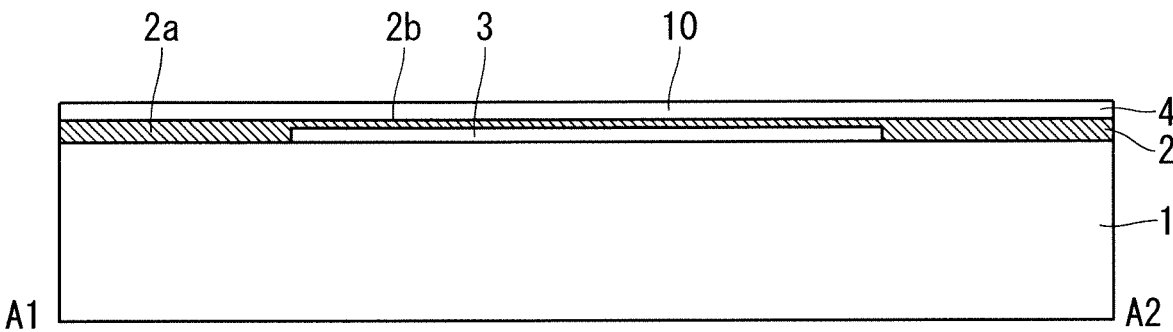
F I G. 1 4
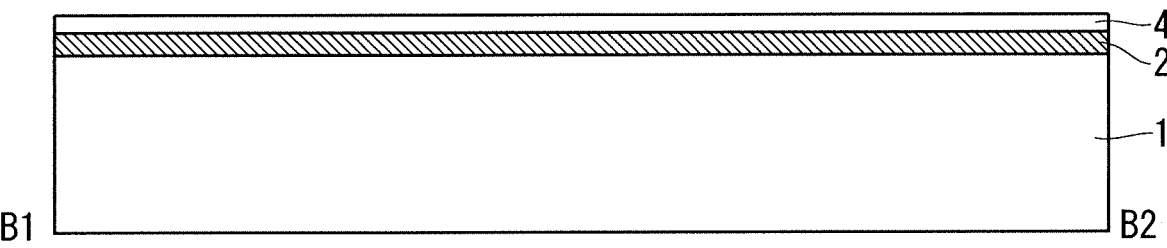
F I G. 1 5
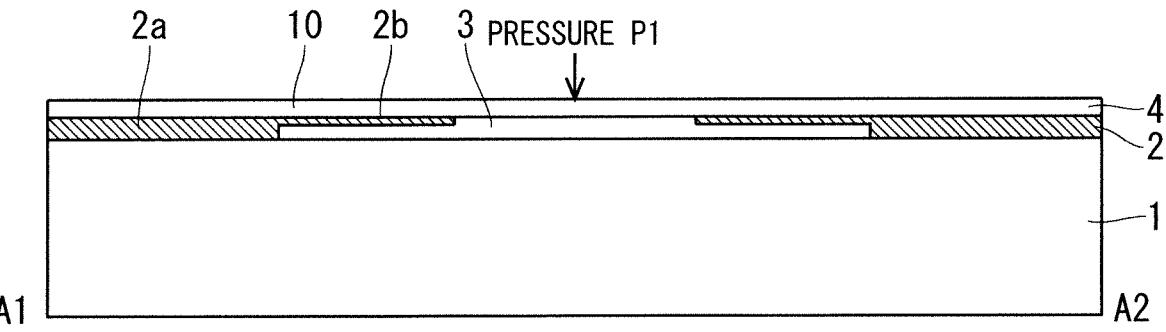

F I G.   1 6
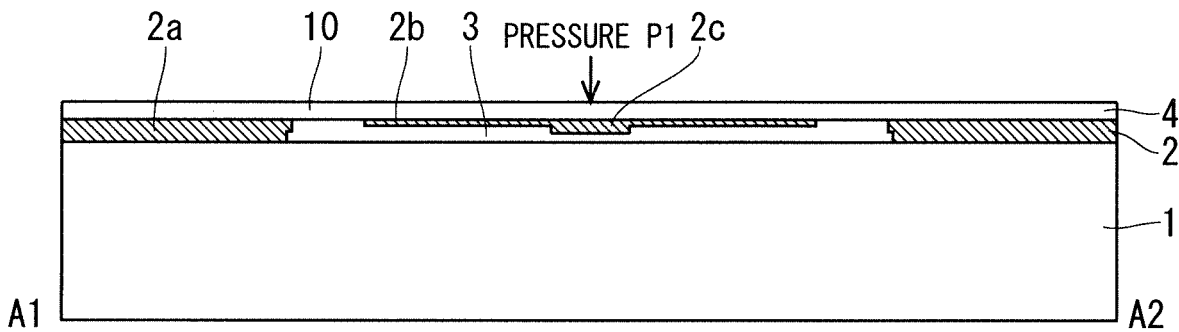

F I G. 1 7
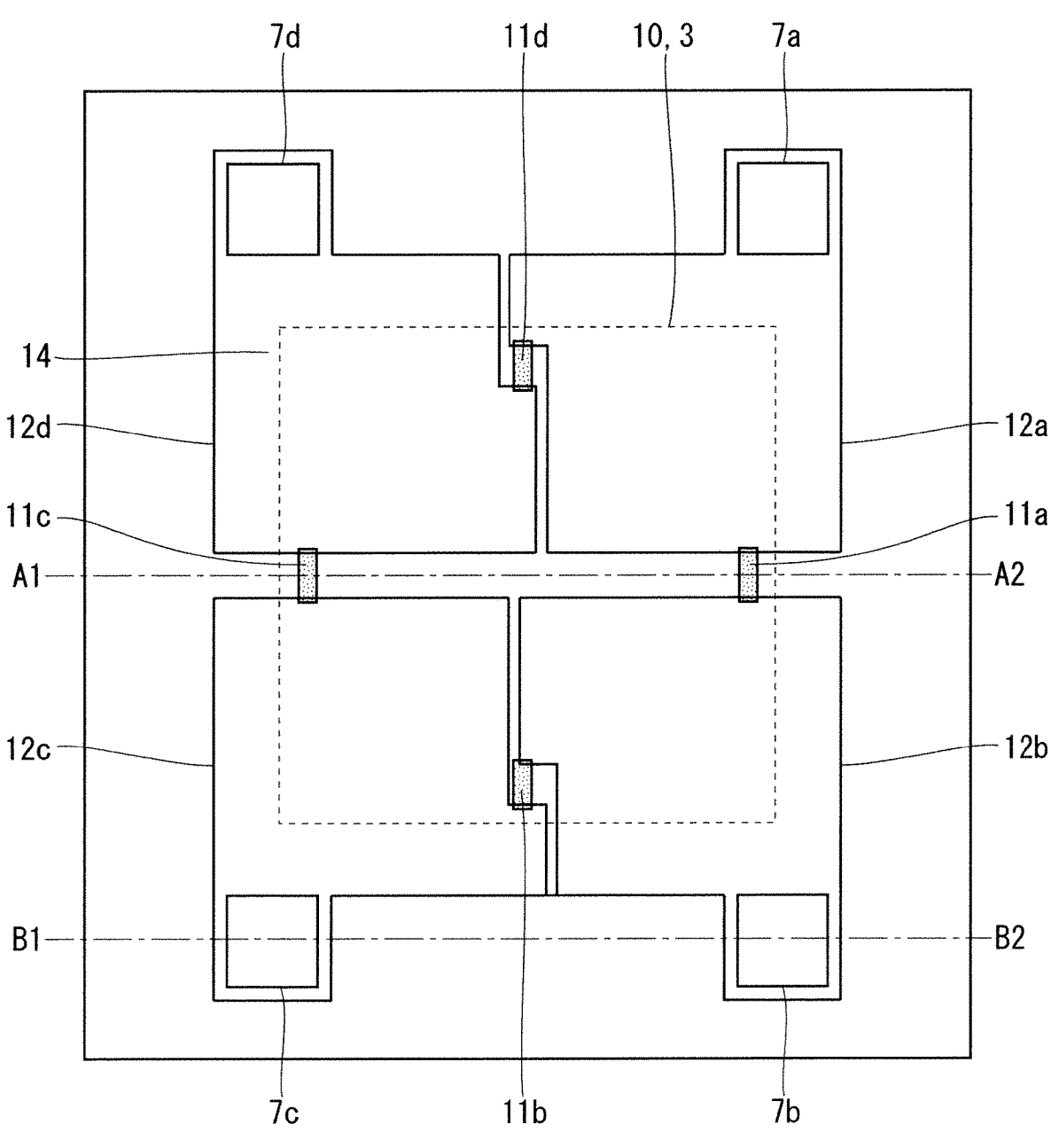

F I G .  1 8
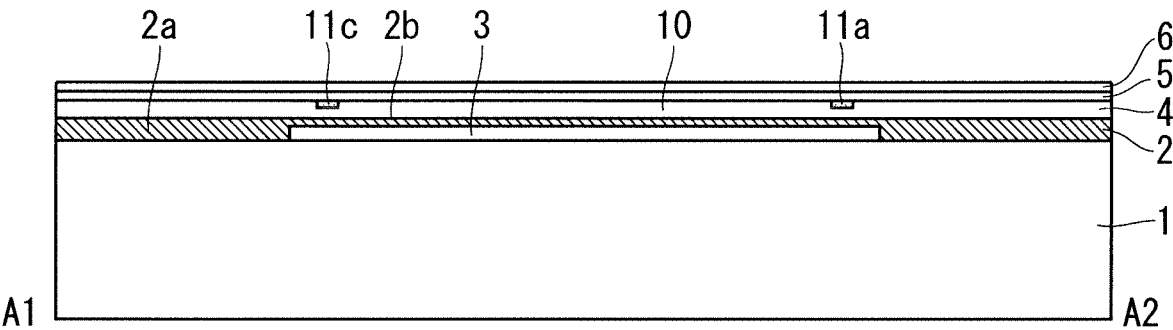
F I G .  1 9
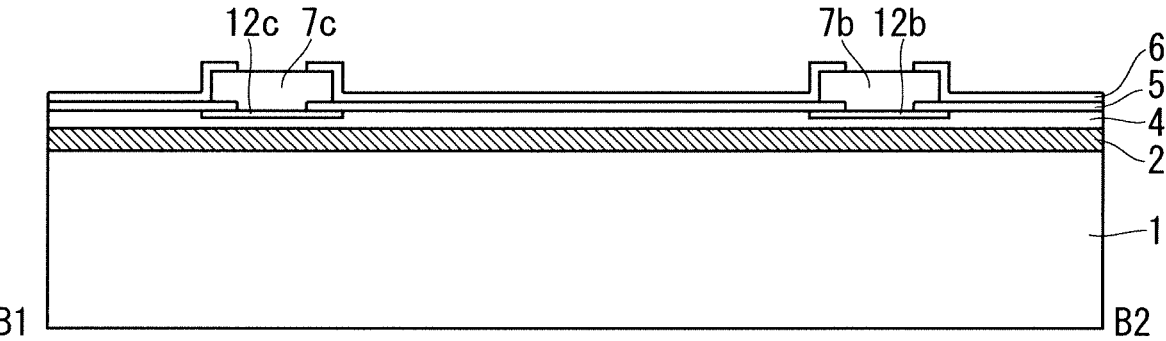

F I G.  2 1
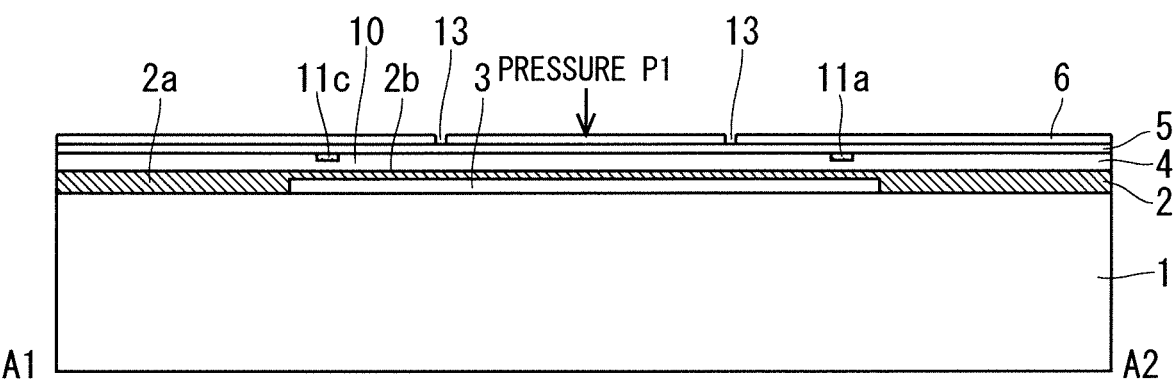
F I G.  2 2
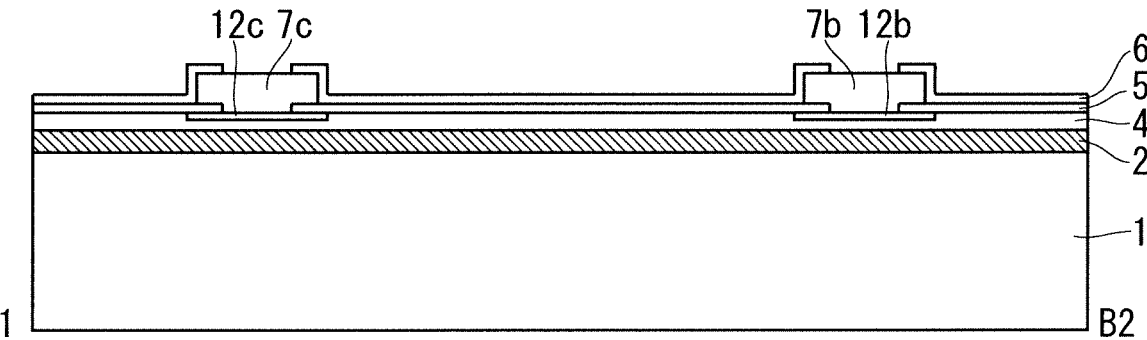

F I G.  2 3
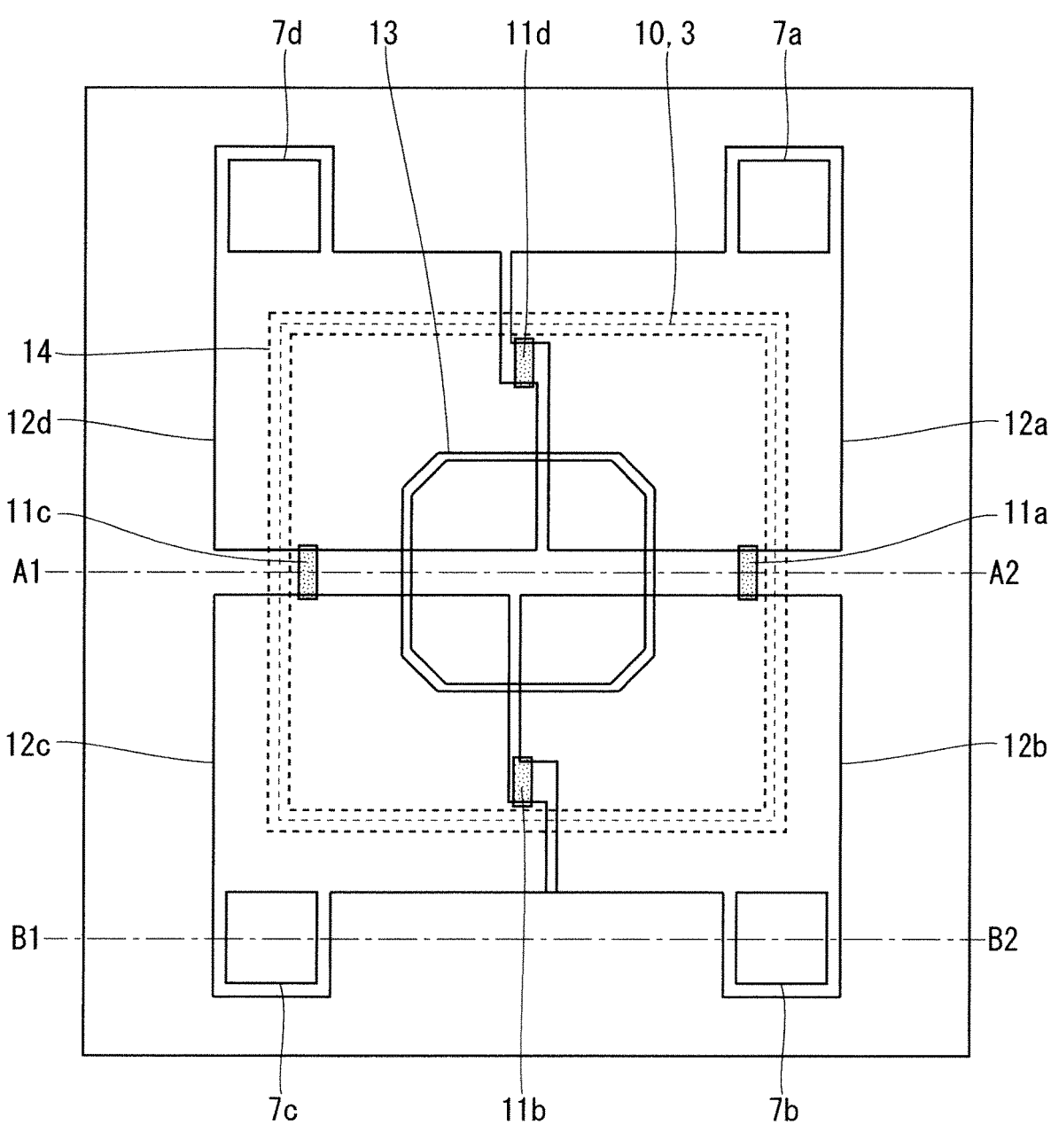

F I G. 2 4
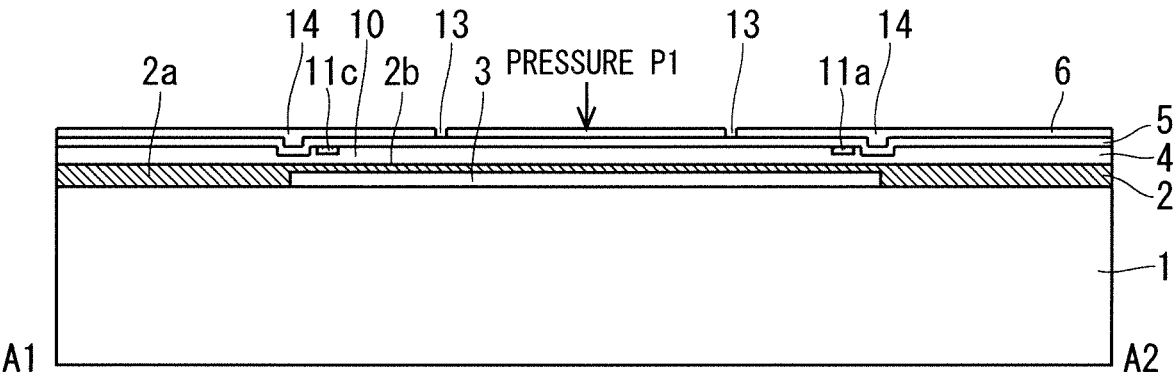
F I G. 2 5
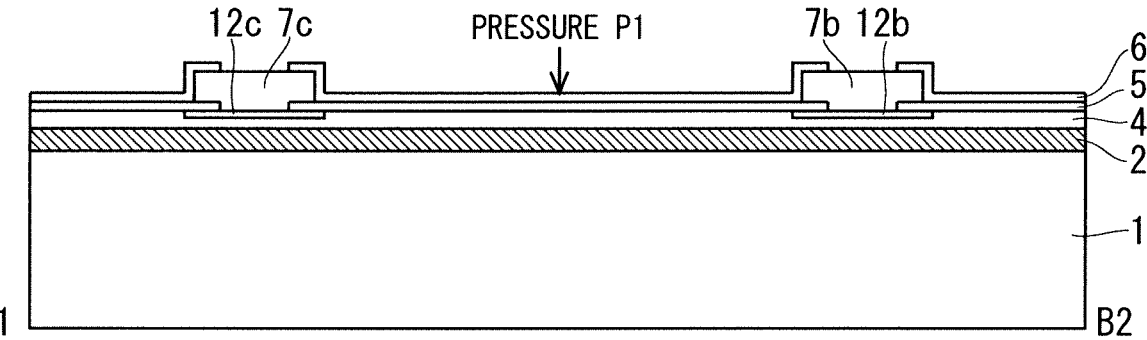

F I G. 2 6
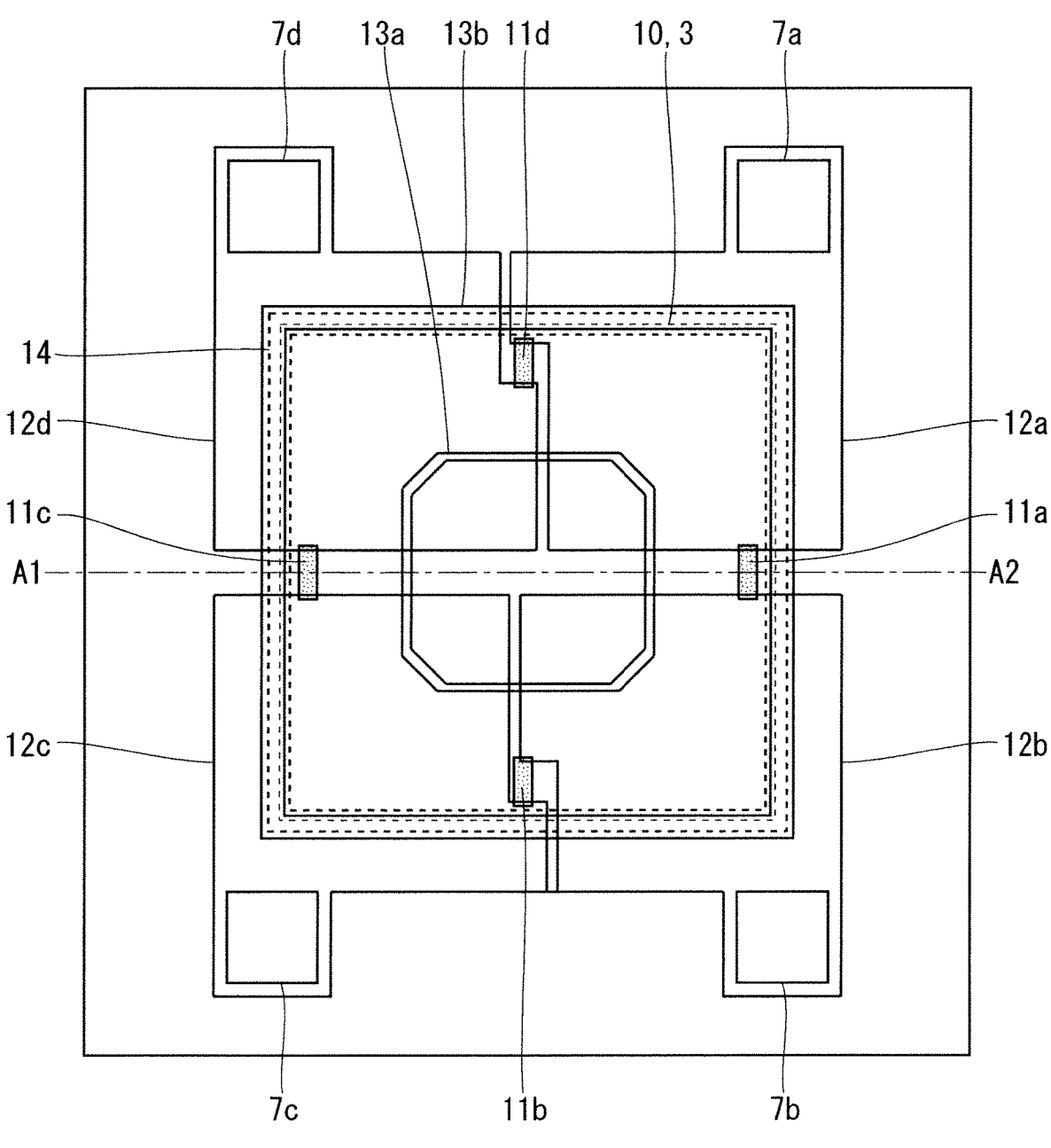

F I G.   2 7
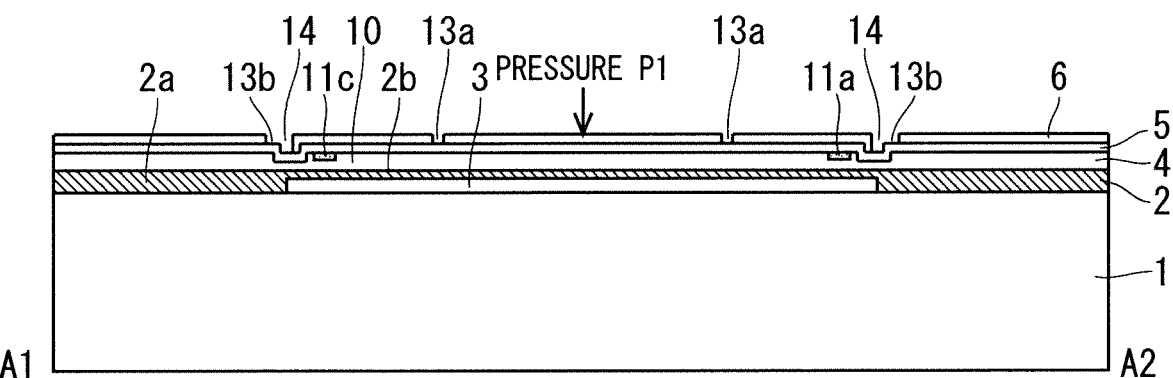

F I G.  2 8
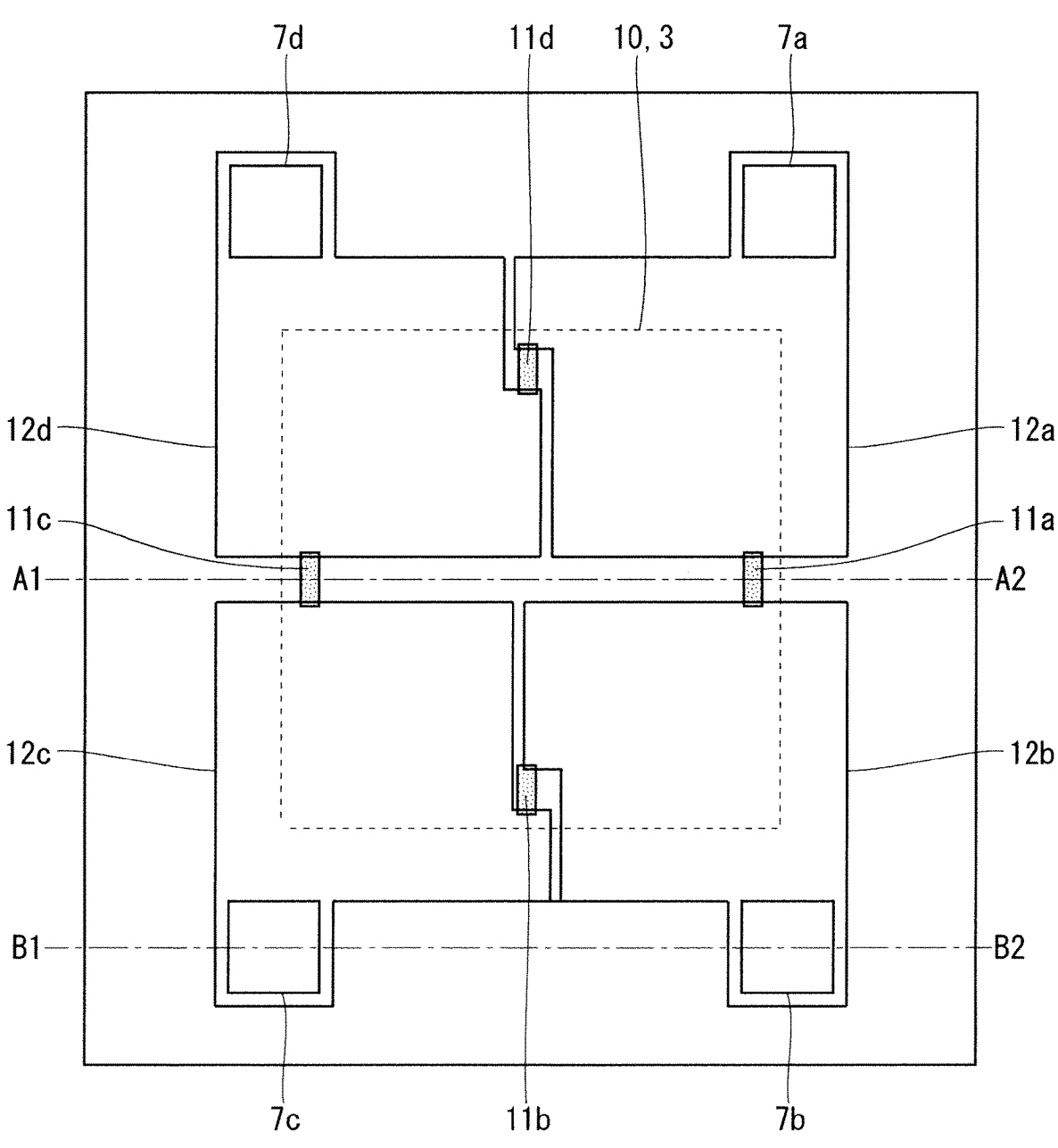

F I G. 2 9
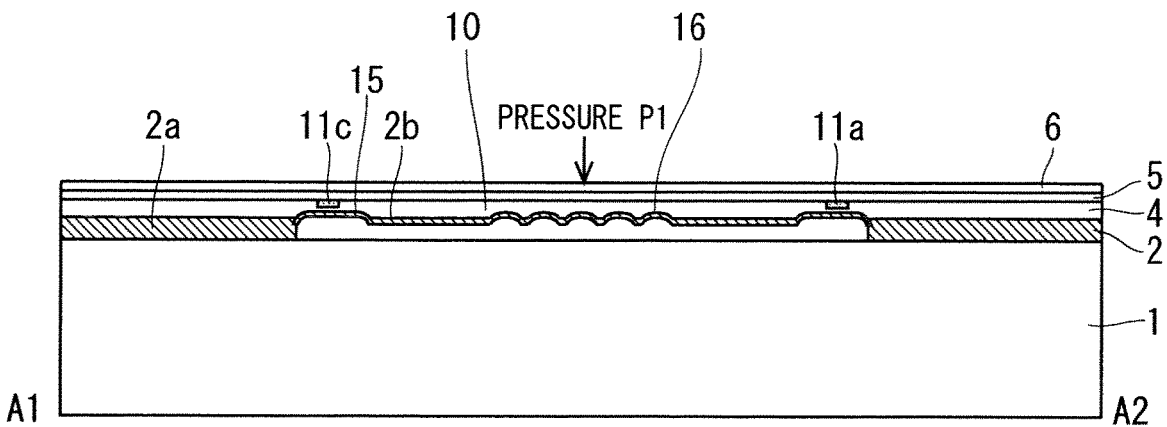
F I G. 3 0
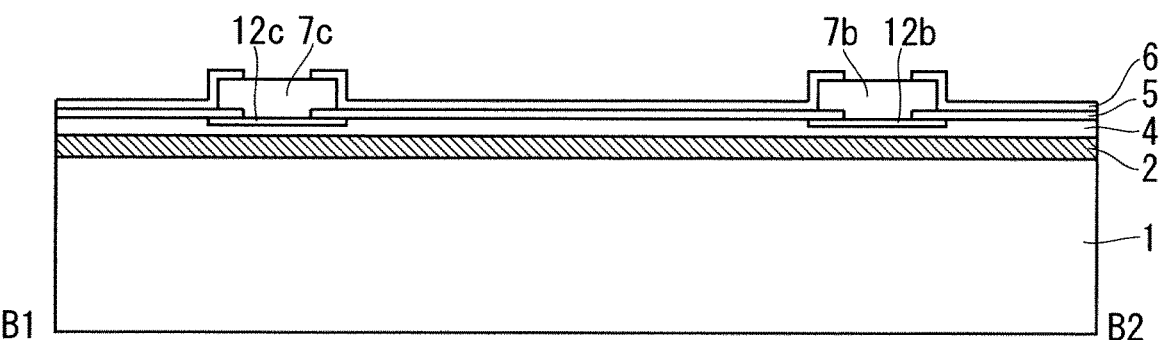
F I G. 3 1
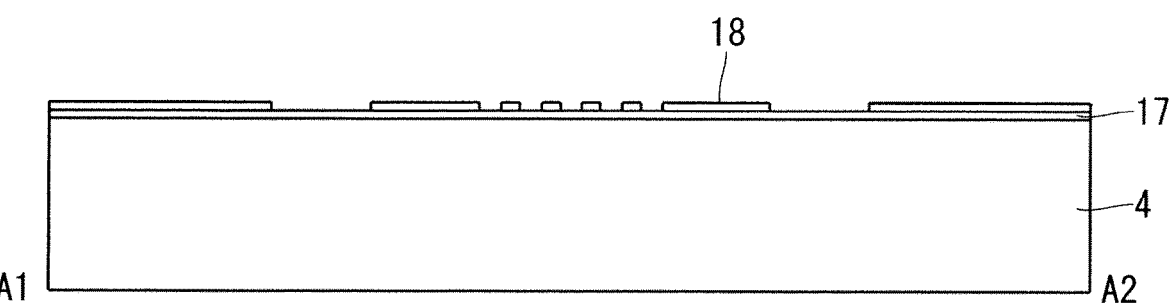

F I G .  3 2
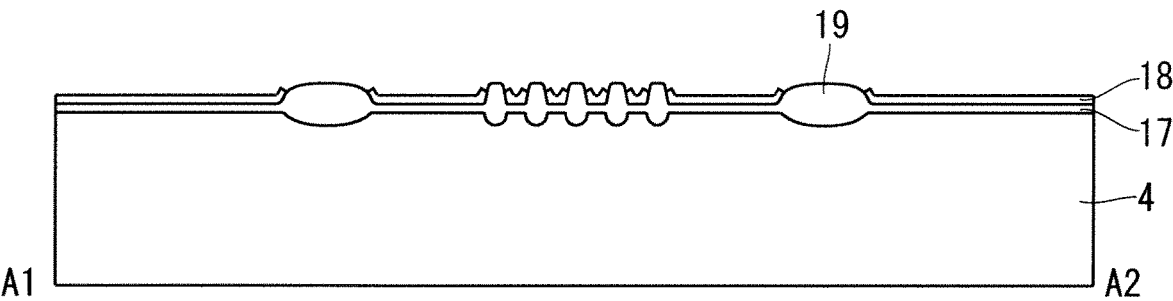
F I G .  3 3
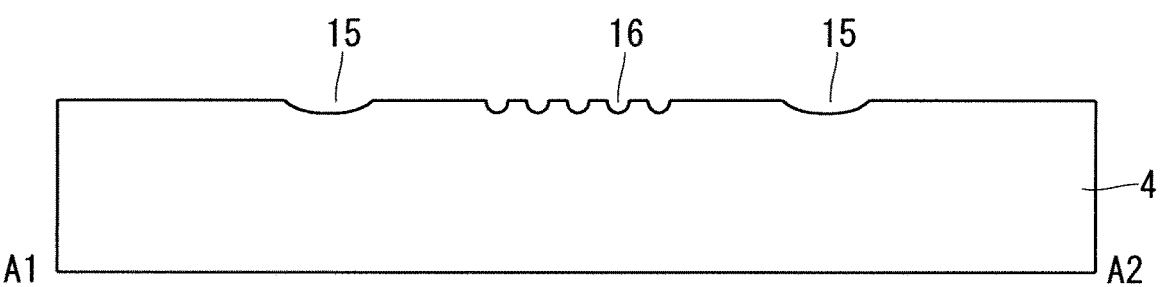
F I G .  3 4
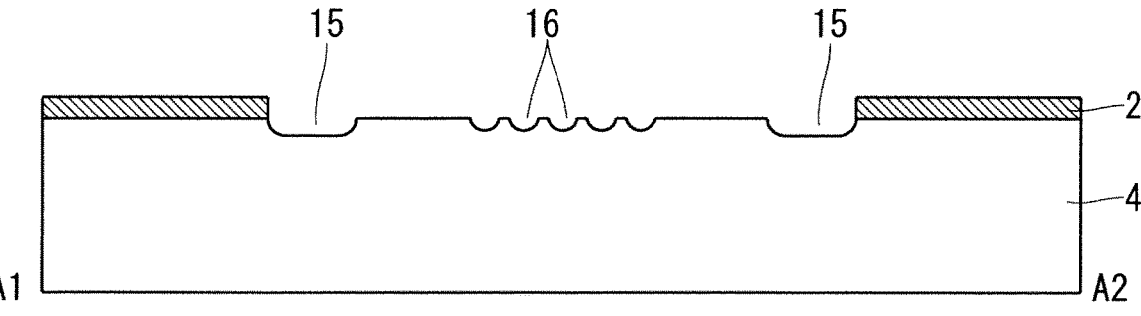

F I G.  3 5
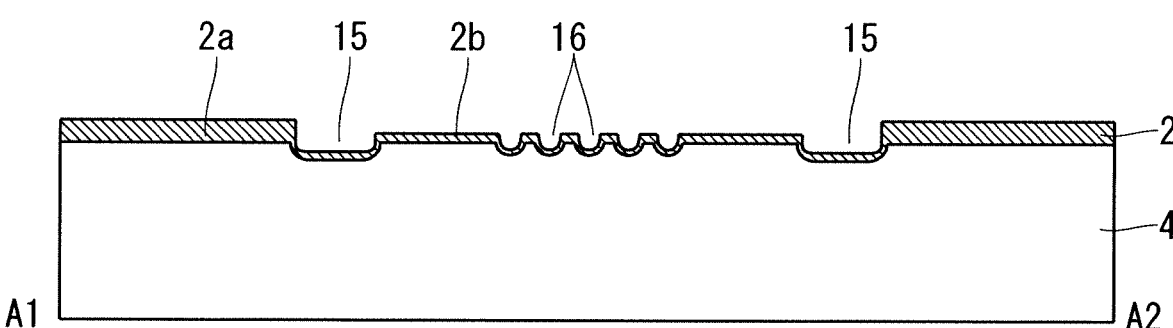

SEMICONDUCTOR PRESSURE SENSOR AND MANUFACTURING METHOD THEREFOR

BACKGROUND OF THE INVENTION

Field of the Invention

The present disclosure relates to a diaphragm type semiconductor pressure sensor that measures a minute pressure, and a manufacturing method for the semiconductor pressure sensor.

Description of the Background Art

Conventionally, a technique relating to a diaphragm type semiconductor pressure sensor has been disclosed (see, for example, Japanese Patent Application Laid-Open No. 2015-145801).

A semiconductor pressure sensor that detects a minute pressure needs to increase the area of a diaphragm and reduce the thickness in order to increase the detection sensitivity to a pressure change. For example, the area of the diaphragm is 3 mm square or less, and the thickness is 20 μm or less.

In a conventional semiconductor pressure sensor, it is difficult to form or process a film on the back surface of the diaphragm. Further, in the conventional semiconductor pressure sensor, it is difficult to control the stress of the diaphragm because only a laminated film provided on a surface of a silicon substrate influences the stress characteristics of the diaphragm. Therefore, a minute pressure applied to the diaphragm is buried in the influence of the stress (deformation of the diaphragm) due to the laminated film, and the minute pressure cannot be detected accurately.

SUMMARY

An object of the present disclosure is to provide a semiconductor pressure sensor capable of accurately detecting a minute pressure and a manufacturing method therefor.

According to the present disclosure, there is provided a semiconductor pressure sensor according to the present disclosure includes: a first silicon substrate; a first silicon oxide film provided on the first silicon substrate and forming a closed space together with the first silicon substrate; a second silicon substrate provided on the first silicon oxide film; a gauge resistor provided on a surface layer of a surface of the second silicon substrate opposite to a surface on which the first silicon oxide film is provided at a position overlapping with the closed space in a plan view; a first electrode electrically connected to one end of the gauge resistor; and a second electrode electrically connected to the other end of the gauge resistor.

According to the present disclosure, the semiconductor pressure sensor includes: the first silicon oxide film provided on the first silicon substrate and forming the closed space together with the first silicon substrate; the second silicon substrate provided on the first silicon oxide film; the gauge resistor provided on the surface layer of the surface of the second silicon substrate opposite to the surface on which the first silicon oxide film is provided at the position overlapping with the closed space in a plan view; the first electrode electrically connected to one end of the gauge resistor; and the second electrode electrically connected to the other end of the gauge resistor. Thus, it is possible to accurately detect a minute pressure.

These and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 1 is a plan view showing an example of a configuration of a semiconductor pressure sensor according to a first preferred embodiment;

FIG. 2 is a cross-sectional view taken along the line A1-A2 of FIG. 1;

FIG. 3 is a cross-sectional view taken along the line B1-B2 of FIG. 1;

FIG. 4 is a flowchart showing an example of a manufacturing process of the semiconductor pressure sensor according to the first preferred embodiment;

FIG. 5 is a plan view for explaining a manufacturing process of the semiconductor pressure sensor according to the first preferred embodiment;

FIG. 6 is a cross-sectional view taken along the line A1-A2 of FIG. 5;

FIG. 7 is a cross-sectional view taken along the line B1-B2 of FIG. 5;

FIG. 8 is a plan view for explaining a manufacturing process of the semiconductor pressure sensor according to the first preferred embodiment;

FIG. 9 is a cross-sectional view taken along the line A1-A2 of FIG. 8;

FIG. 10 is a plan view for explaining a manufacturing process of the semiconductor pressure sensor according to the first preferred embodiment;

FIG. 11 is a cross-sectional view taken along the line A1-A2 of FIG. 10;

FIG. 12 is a plan view for explaining a manufacturing process of the semiconductor pressure sensor according to the first preferred embodiment;

FIG. 13 is a cross-sectional view taken along the line A1-A2 of FIG. 12;

FIG. 14 is a cross-sectional view taken along the line B1-B2 of FIG. 12;

FIG. 15 is a cross-sectional view taken along the line A1-A2 of FIG. 12;

FIG. 16 is a cross-sectional view taken along the line A1-A2 of FIG. 12;

FIG. 17 is a plan view for explaining a manufacturing process of the semiconductor pressure sensor according to the first preferred embodiment;

FIG. 18 is a cross-sectional view taken along the line A1-A2 of FIG. 17;

FIG. 19 is a cross-sectional view taken along the line B1-B2 of FIG. 17;

FIG. 21 is a cross-sectional view taken along the line A1-A2 of FIG. 20;

FIG. 22 is a cross-sectional view taken along the line B1-B2 of FIG. 20;

FIG. 23 is a plan view showing an example of a configuration of a semiconductor pressure sensor according to a third preferred embodiment;

FIG. 24 is a cross-sectional view taken along the line A1-A2 of FIG. 23;

FIG. 25 is a cross-sectional view taken along the line B1-B2 of FIG. 23;

FIG. 26 is a plan view showing an example of the configuration of the semiconductor pressure sensor according to the third preferred embodiment;

FIG. 27 is a cross-sectional view taken along the line A1-A2 of FIG. 26;

FIG. 28 is a plan view showing an example of a configuration of a semiconductor pressure sensor according to a fourth preferred embodiment;

FIG. 29 is a cross-sectional view taken along the line A1-A2 of FIG. 28;

FIG. 30 is a cross-sectional view taken along the line B1-B2 of FIG. 28; and FIGS. 31 to 35 are cross-sectional views each for explaining a manufacturing process of the semiconductor pressure sensor according to the fourth preferred embodiment.

DESCRIPTION OF THE PREFERRED EMBODIMENTS

First Preferred Embodiment

<Configuration>

Figure 20:
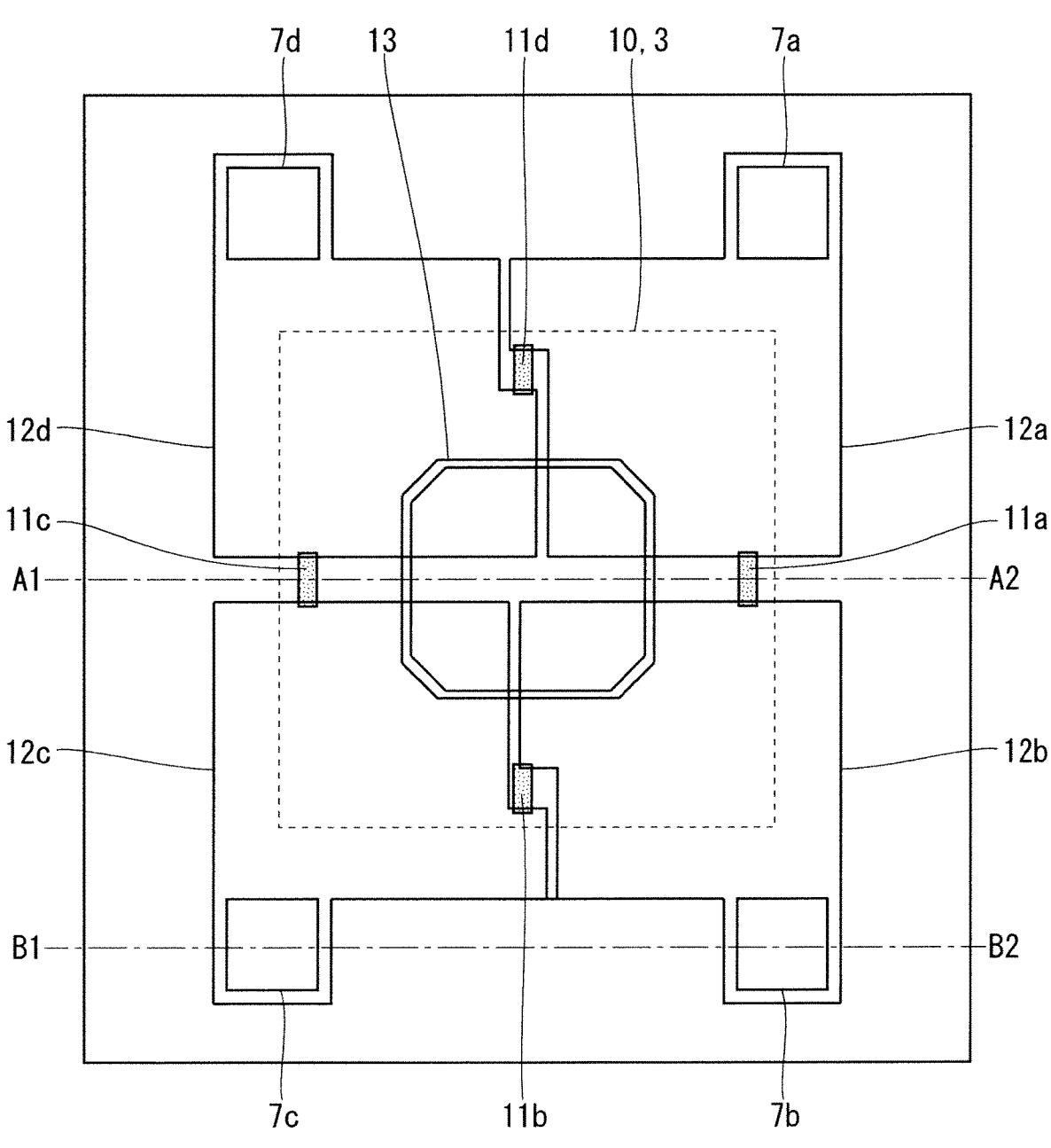
FIG. 20 is a plan view showing an example of a configuration of a semiconductor pressure sensor according to a second preferred embodiment.

FIG. 1 is a plan view showing an example of a configuration of a semiconductor pressure sensor according to a first preferred embodiment. FIG. 2 is a cross-sectional view taken along the line A1-A2 of FIG. 1. FIG. 3 is a cross-sectional view taken along the line B1-B2 of FIG. 1. Hereinafter, the configuration of the semiconductor pressure sensor according to the first preferred embodiment will be described with reference to FIGS. 1 to 3.

A first silicon substrate 1 may be either a first conductive type (n type) or a second conductive type (p type). Further, since the first silicon substrate 1 serves as a base of a Silicon On Insulator (SOI) substrate, the thickness is about 200 to 900 μm.

A first silicon oxide film 2 is provided on the first silicon substrate 1 and includes a thick film portion 2a which is an outer edge portion and a first thin film portion 2b which is an inner portion. One surface of the thick film portion 2a is in contact with the first silicon substrate 1, and the other surface is in contact with a second silicon substrate 4. One surface of the first thin film portion 2b faces the first silicon substrate 1 across a closed space 3, and the other surface is in contact with the second silicon substrate 4. As described above, the first silicon oxide film 2 forms the closed space 3 together with the first silicon substrate 1.

The second silicon substrate 4 is the first conductive type (n type) and is provided on the first silicon oxide film 2. A diaphragm 10 corresponds to a portion of the second silicon substrate 4 that overlaps with the closed space 3 in a plan view. That is, in a plan view, the diaphragm 10 and the closed space 3 coincide with each other.

Assuming that the pressure applied to the surface of the diaphragm 10 from the outside is P1 and the pressure in the closed space 3 is P2, the diaphragm 10 is deformed by the pressure of (P2−P1). Specifically, since the pressure P1 applied to the surface of the diaphragm 10 from the outside is higher than the pressure P2 in the closed space 3, the diaphragm 10 is deformed toward the first silicon substrate 1. Here, the first thin film portion 2b of the first silicon oxide film 2 functions as a stress adjusting film for a second silicon oxide film 5 and a protective film 6 existing on the diaphragm 10. Therefore, by appropriately setting the film thickness of the first thin film portion 2b, it is possible to obtain a desired bending shape of the diaphragm 10.

Further, the movable range of the diaphragm 10 can be determined by the distance between the first thin film portion

2b and the first silicon substrate 1 (height of the closed space 3). Therefore, when an excessive pressure is applied to the surface of the diaphragm 10 from the outside, by changing the thickness and the shape of the first silicon oxide film 2 so that the stress more than the fracture stress is not applied to the diaphragm 10, the distance between the first thin film portion 2b and the first silicon substrate 1 can be set optionally. In the first preferred embodiment, the thickness of the first silicon oxide film 2 is about 0.5 to 5 μm, and the thickness of the diaphragm 10 on the second silicon substrate 4 is about 5 to 30 μm.

Gauge resistors 11a, 11b, 11c, and 11d are provided on the surface layer of the second silicon substrate 4 (surface layer of the surface of the second silicon substrate 4 opposite to the surface on which the first silicon oxide film 2 is formed) at positions overlapping with the diaphragm 10 in a plan view. Specifically, the gauge resistors 11a, 11b, 11c, and 11d are provided on the respective four sides defining the diaphragm 10, as shown in FIG. 1. The gauge resistors 11a, 11b, 11c, and 11d are the second conductive type (p type) and are formed by ion implantation into the surface layer of the second silicon substrate 4.

Diffusion wirings 12a, 12b, 12c, and 12d are provided so as to be in contact with one end or the other end of the gauge resistors 11a, 11b, 11c, and 11d. For example, the diffusion wiring 12a (first diffusion wiring) is in contact with one end of the gauge resistor 11a, and the diffusion wiring 12b (second diffusion wiring) is in contact with the other end of the gauge resistor 11a. One end and the other end described here may be reversed. As shown in FIG. 1, the gauge resistors 11a, 11b, 11c, and 11d are connected so as to form a Wheatstone bridge circuit by the diffusion wirings 12a, 12b, 12c, and 12d.

When the diaphragm 10 is deformed by the pressure difference (P1−P2) between the pressure P1 applied to the surface of the diaphragm 10 from the outside and the pressure P2 in the closed space 3, the stress according to the amount of deformation of the diaphragm 10 is applied each of the gauge resistors 11a, 11b, 11c, and 11d. The gauge resistors 11a, 11b, 11c, and 11d have the property that the resistance value changes according to the magnitude of the stress applied to them. Therefore, by connecting the gauge resistors 11a, 11b, 11c, and 11d so as to form a Wheatstone bridge circuit, it is possible to detect the change in the resistance value in each of the gauge resistors 11a, 11b, 11c, and 11d as an output voltage. The output voltage detected here is output to the outside from electrodes 7a, 7b, 7c, and 7d provided in the diffusion wirings 12a, 12b, 12c, and 12d, respectively. For example, the electrode 7a (first electrode) is electrically connected to one end of the gauge resistor 11a via the diffusion wiring 12a. Further, the electrode 7b (second electrode) is electrically connected to the other end of the gauge resistor 11a via the diffusion wiring 12b.

The second silicon substrate 4 may be the second conductive type (p type), and the gauge resistors 11a, 11b, 11c, and 11d may be the first conductive type (n type). In this case, it is necessary to change the arrangement of the gauge resistors 11a, 11b, 11c, and 11d with respect to the diaphragm 10.

It is necessary that the diffusion wirings 12a, 12b, 12c, and 12d are low resistance because the diffusion wirings 12a, 12b, 12c, and 12d are intended to reduce the change in the resistance value that occurs in the diffusion wirings 12a, 12b, 12c, and 12d when pressure is applied to the diaphragm 10 and be used as wirings for connecting the gauge resistors 11a, 11b, 11c, and 11d so as form a Wheatstone bridge circuit. In the first preferred embodiment, the diffusion wirings 12a, 12b, 12c, and 12d have a diffusion surface density of about 1e19 to 1e20 ions/cm$^3$ and a diffusion depth of about 2 to 5 μm. Further, the gauge resistors 11a, 11b, 11c, and 11d have a diffusion surface concentration of about 5e17 to 5e18 ions/cm$^3$ and a diffusion depth of about 0.5 to 1.5 μm in consideration of the balance between the resistance value, the amount of change in the resistance value with respect to the stress, and the temperature characteristics.

<Detection Method for Pressure Using Diaphragm 10>

The pressure applied to the surface of the diaphragm 10 from the outside is P1 and the pressure in the closed space 3 is P2. The closed space 3 is a vacuum chamber, and the pressure P2 in the closed space 3 is used as a reference pressure. As a result, the semiconductor pressure sensor according to the first preferred embodiment has a function of measuring an absolute pressure.

As described above, a cavity SOI substrate can be obtained by laminating the first silicon substrate 1 and the second silicon substrate 4 via the first silicon oxide film 2 including the thick film portion 2a and the first thin film portion 2b. Therefore, it is possible to detect a minute pressure difference (P1−P2) while controlling the bending shape of the diaphragm 10 so that the first silicon substrate 1 has a stopper structure.

The detection sensitivity to a pressure change can be controlled by the thickness of the diaphragm 10 and the area of the diaphragm 10 in a plan view. The thickness of the diaphragm 10 is defined by the thickness of the second silicon substrate 4. The area of the diaphragm 10 is defined by the area of the closed space 3 in a plan view. Further, the movable range of the diaphragm 10 can be controlled by the height of the closed space 3. The height of the closed space 3 is defined by the step between the thick film portion 2a and the first thin film portion 2b.

From the above, by making the first silicon substrate 1 (the first silicon substrate 1 corresponding to the lower part of the closed space 3) forming the closed space 3 function as a stopper so that the stress more than the fracture strength is not applied to the diaphragm 10, it becomes possible to limit the movable range of the diaphragm 10. As a result, damage to the diaphragm 10 can be prevented, and a semiconductor pressure sensor that is easy to handle can be easily obtained.

Further, as a stress adjusting film for the second silicon oxide film 5 and the protective film 6 provided on the diaphragm 10, the first thin film portion 2b of the first silicon oxide film 2 is provided on the back surface of the diaphragm 10. As a result, the stress applied to the diaphragm 10 can be balanced, a desired bending shape of the diaphragm 10 can be obtained, and a change in the bending of the diaphragm 10 following a minute pressure change can be generated. In addition, when the stress is applied to the gauge resistors 11a, 11b, 11c, and 11d due to the minute pressure change, the resistance values thereof change. Since the gauge resistors 11a, 11b, 11c, and 11d are connected so as to form a Wheatstone bridge circuit by the diffusion wirings 12a, 12b, 12c, and 12d, the output voltage changes according to the change of its own resistance value. By outputting such a change in output voltage from the electrodes 7a, 7b, 7c, and 7d to the outside, it becomes possible to detect a minute change in pressure.

For example, when the semiconductor pressure sensor can detect a pressure of about 1 atm, the area of the diaphragm 10 is 400 μm square, the thickness is 10 μm, and the height of the closed space 3 is about 1.5 μm. With this, when a pressure of about 5 atm is applied, the diaphragm 10 comes into contact with the first silicon substrate 1. At this time, the first silicon substrate 1 functions as a stopper.

<Manufacturing Method>

A manufacturing method for the semiconductor pressure sensor according to the first preferred embodiment will be described with reference to FIGS. 4 to 19.

FIG. 4 is a flowchart showing an example of a manufacturing process of the semiconductor pressure sensor according to the first preferred embodiment.

In step S1, as shown in FIGS. 5 to 7, the first silicon oxide film 2 is formed on the second silicon substrate 4. The thickness of the first silicon oxide film 2 is about 0.5 to 5 μm. The first silicon oxide film 2 may be formed by using a well-known technique. For example, by heating the second silicon substrate 4 in an oxygen atmosphere at about 700 to 1,100° C., a silicon thermal oxide film (corresponding to the first silicon oxide film 2) obtained by modifying the second silicon substrate into a silicon oxide film is formed. Next, as shown in FIG. 6, an opening forming the closed space 3 is formed by performing a photoengraving process and an etching process.

Next, as shown in FIGS. 8 and 9, the first silicon oxide film 2 and the second silicon substrate 4 formed in the above are subjected to an oxidation treatment. As a result, the first silicon oxide film 2 including the thick film portion 2a and the first thin film portion 2b is formed. The thickness of the thick film portion 2a is about 0.01 to 2 μm. In order to make the first thin film portion 2b function as a stress control film for the diaphragm 10 formed in the subsequent process, the thickness of the first thin film portion 2b of the first silicon oxide film 2 is set according to the film stress characteristics of the second silicon oxide film 5 and the protective film 6 formed on the diaphragm 10 in the subsequent process.

As shown in FIG. 9, the step between the thick film portion 2a and the first thin film portion 2b in the first silicon oxide film 2 corresponds to the height of the closed space 3. That is, the movable range of the diaphragm 10 can be determined by the step between the thick film portion 2a and the first thin film portion 2b.

In step S2, as shown in FIGS. 10 and 11, the first silicon substrate 1 and the second silicon substrate 4 are joined to each other by bonding them via the first silicon oxide film 2 and performing a heat treatment. As a result, the closed space 3 is formed by the thick film portion 2a and the first thin film portion 2b in the first silicon oxide film 2 and the first silicon substrate 1. Further, by joining the first silicon substrate 1 and the second silicon substrate 4 in a vacuum atmosphere, the closed space 3 becomes a vacuum chamber. The pressure P2 of the closed space 3 formed in this way serves as the reference pressure with respect to the pressure P1 applied to the diaphragm 10 formed in the subsequent process.

In the above, the case where the first silicon substrate 1 and the second silicon substrate 4 are joined after the first silicon oxide film 2 is formed on the second silicon substrate 4 has been described, but the present invention is not limited to this. For example, the first silicon substrate 1 and the second silicon substrate 4 may be joined after the thick film portion 2a is formed on the first silicon substrate 1 and the first thin film portion 2b is formed on the second silicon substrate 4.

In step S3, as shown in FIGS. 12 to 14, the second silicon substrate 4 is polished to a desired thickness of the diaphragm 10. As a result, the portion of the second silicon substrate 4 that overlaps with the closed space 3 in a plan view functions as the diaphragm 10. By adjusting the thickness of the diaphragm 10, the pressure detection sensitivity can be controlled.

In the above description, for example, as shown in FIG. 13, the case where the first thin film portion 2b of the first silicon oxide film 2 is formed so as to cover the entire back surface of the diaphragm 10 has been described, but the present invention is not limited to this.

For example, as shown in FIG. 15, the first silicon oxide film 2 may have an opening in the center of the first thin film portion 2b. With such a configuration, the stress applied to the diaphragm 10 can be adjusted from the edge to the center of the diaphragm 10.

Further, for example, as shown in FIG. 16, the first silicon oxide film 2 may have an opening at a position overlapping with the edge of the diaphragm 10 in a plan view, and may include a second thin film portion 2c thicker than the first thin film portion 2b in the center of the first thin film portion 2b. With such a configuration, the stress control of the diaphragm 10 can be adjusted from the back surface side of the diaphragm 10 in consideration of the film stress on the front surface side of the diaphragm 10, so that the bending shape of the diaphragm 10 can be controlled further accurately.

In step S4, as shown in FIGS. 17 to 19, the gauge resistors 11a, 11b, 11c, and 11d and the diffusion wirings 12a, 12b, 12c, and 12d are formed on the second silicon substrate 4.

Specifically, impurity injection is performed after the second silicon substrate 4 is subjected to an oxidation treatment and a photoengraving process. After that, the diffusion wirings 12a, 12b, 12c, and 12d are formed by performing an annealing treatment and an oxidation treatment. The diffusion wirings 12a, 12b, 12c, and 12d are low resistance wirings for connecting the gauge resistors 11a, 11b, 11c, and 11d to be formed next so as to form a Wheatstone bridge. In the first preferred embodiment, the concentration of impurities to be injected is about 5e14 to 5e15 ions/cm$^2$, the annealing temperature is about 1,000 to 1,100° C., and the oxidation treatment is performed to about 100 to 500 nm, so that a diffusion layer having a diffusion depth of about 2 to 5 μm is formed. As a result, low resistance diffusion wirings 12a, 12b, 12c, and 12d are realized.

Next, impurity injection is performed after an oxidation treatment and a photoengraving process are performed. After that, the gauge resistors 11a, 11b, 11c, and 11d are formed by performing annealing. The gauge resistors 11a, 11b, 11c, and 11d are connected so as to form a Wheatstone bridge circuit by the diffusion wirings 12a, 12b, 12c, and 12d. In the first preferred embodiment, the concentration of impurities to be injected when the gauge resistors 11a, 11b, 11c, and 11d are formed is about 1e13 to 1e14 ions/cm$^2$. When the concentration of impurities is lowered, the detection sensitivity to the pressure change is increased, but the temperature characteristics are deteriorated. Therefore, an appropriate concentration of impurities is set in consideration of the trade-off relationship between the detection sensitivity and the temperature specification.

In step S5, as shown in FIGS. 17 to 19, the second silicon oxide film 5, the electrodes 7a, 7b, 7c, and 7d, and the protective film 6 are formed on the second silicon substrate 4.

Specifically, after all the oxide films deposited when the diffusion wirings 12a, 12b, 12c, and 12d and the gauge resistors 11a, 11b, 11c, and 11d are formed are removed, the second silicon oxide film 5 is formed on the second silicon substrate 4. With this, the second silicon oxide film 5 formed on the surface of the diaphragm 10 becomes flat, and the deformation characteristics of the diaphragm 10 with respect to the pressure change are improved. A Phospho Silicate Glass (PSG) film or a Boro-Phospho Silicate Glass (BPSG) film may be deposited on the second silicon oxide film 5 as a passivation film (not shown).

Next, in order to output an electric signal from the diffusion wirings 12a, 12b, 12c, and 12d to the outside, a photoengraving process and an etching process are performed to form contact holes (not shown). After that, a metal film such as AlSi, AlCu, Al, or AlSiCu is deposited on the second silicon substrate 4, and then a photoengraving process and an etching process are performed to form the electrodes 7a, 7b, 7c, and 7d in the contact holes.

Next, the protective film 6 is formed. For example, a nitride film is deposited on the entire surface by plasma CVD (Chemical Vapor Deposition), and then a photoengraving process and an etching process are performed to form the protective film 6 that opens at only desired positions (parts of the surface which correspond to the electrodes 7a, 7b, 7c, and 7d).

The semiconductor pressure sensor completed through the manufacturing processes of steps S1 to S5 above is an absolute pressure sensor that detects the pressure P1 received on the surface of the diaphragm 10 with the pressure P2 of the closed space 3 which is a vacuum chamber as the reference pressure.

<Effects>

According to the first preferred embodiment, the first thin film portion 2b of the first silicon oxide film 2 which serves as the stress control film is provided on the back surface of the diaphragm 10. Therefore, the first thin film portion 2b can balance the stress of the second silicon oxide film 5 or the protective film 6 provided on the surface of the diaphragm 10, and the stress applied to the diaphragm 10 can be controlled to obtain a desired bending shape of the diaphragm 10.

Generally, when a pressure in the detection range of the semiconductor pressure sensor is applied to the diaphragm 10, the diaphragm 10 is controlled to bend toward the closed space 3. This makes it possible to accurately detect a minute pressure change as a change in the amount of bending of the diaphragm 10. The change in the amount of bending of the diaphragm 10 can be detected as a change in the stress applied to the gauge resistors 11a, 11b, 11c, and 11d provided on the four sides of the diaphragm 10, a change in the resistance value of the gauge resistors 11a, 11b, 11c, and 11d, or a change in the output voltage of the Wheatstone bridge configured by connecting the gauge resistors 11a, 11b, 11c, and 11d by the diffusion wirings 12a, 12b, 12c, and 12d.

As described above, according to the first preferred embodiment, it is possible to obtain a semiconductor pressure sensor capable of detecting a minute pressure with high accuracy by a simple manufacturing process.

Second Preferred Embodiment

FIG. 20 is a plan view showing an example of a configuration of a semiconductor pressure sensor according to a second preferred embodiment. FIG. 21 is a cross-sectional view taken along the line A1-A2 of FIG. 20. FIG. 22 is a cross-sectional view taken along the line B1-B2 of FIG. 20. Hereinafter, the configuration of the semiconductor pressure sensor according to the second preferred embodiment will be described with reference to FIGS. 20 to 22.

The second preferred embodiment is characterized in that a protective film stress adjusting groove 13 (first groove) is provided in the protective film 6 provided on the surface of the diaphragm 10. In other words, the protective film 6 includes the protective film stress adjusting groove 13 provided at a position overlapping with the closed space 3 in a plan view. Since other configurations are the same as those in the first preferred embodiment, detailed description thereof will be omitted here.

Next, a forming method for the protective film stress adjusting groove 13 will be described. Regarding the manufacturing method for the semiconductor pressure sensor according to the second preferred embodiment, the manufacturing processes other than the process of forming the protective film stress adjusting groove 13 are the same as those of the first preferred embodiment.

After the protective film 6 is formed in step S5 of FIG. 4, a photoengraving process is performed, and the protective film is etched using a resist mask (not shown). As a result, the protective film stress adjusting groove 13 is formed in the protective film 6. Since the protective film stress adjusting groove 13 can be formed in the same process as the process of opening parts of the surface which correspond to the electrodes 7a, 7b, 7c, and 7d, no additional step is required.

From the above, according to the second preferred embodiment, the stress applied to the diaphragm 10 can be adjusted by providing the protective film stress adjusting groove 13 in the protective film 6, so that the bending shape of the diaphragm 10 can be controlled more accurately. Moreover, such a semiconductor pressure sensor can be easily obtained.

Third Preferred Embodiment

FIG. 23 is a plan view showing an example of a configuration of a semiconductor pressure sensor according to a third preferred embodiment. FIG. 24 is a cross-sectional view taken along the line A1-A2 of FIG. 23. FIG. 25 is a cross-sectional view taken along the line B1-B2 of FIG. 23. Hereinafter, the configuration of the semiconductor pressure sensor according to the third preferred embodiment will be described with reference to FIGS. 23 to 25.

The third preferred embodiment is characterized in that a groove 14 (second groove) is provided in the second silicon substrate 4 along the edge of the diaphragm 10. In other words, the second silicon substrate 4 has the groove 14 provided in a surface opposite to the surface on which the first silicon oxide film 2 is provided along the outer edge of the closed space 3 in a plan view. Since other configurations are the same as those in the second preferred embodiment, detailed description thereof will be omitted here.

The groove 14 has a width of about 3 to 30 μm and a depth of about 0.3 to 3 μm.

Next, a forming method for the groove 14 will be described. Regarding the manufacturing method for the semiconductor pressure sensor according to the third preferred embodiment, the manufacturing processes other than the process of forming the groove 14 are the same as those of the second preferred embodiment.

After the second silicon substrate 4 is polished in step S3 of FIG. 4, a photoengraving process is performed, and the second silicon substrate 4 is etched using a resist mask (not shown). As a result, the groove 14 is formed in the second silicon substrate 4.

As another forming method different from the above, the groove 14 may be formed by locally oxidizing the portion where the groove 14 is to be formed by LOCOS (Local Oxidation of Silicon) oxidation to form an oxide film, and then removing the oxide film.

From the above, according to the third preferred embodiment, by providing the groove 14 in the second silicon substrate 4, the same effects as when the entire diaphragm 10 is thinned can be obtained. Therefore, the detection sensitivity of the diaphragm 10 to a minute pressure change can be increased. Further, the area of the diaphragm 10 can be reduced, and the size of the semiconductor pressure sensor can be reduced, so that the cost can be reduced.

As shown in FIGS. 26 and 27, a protective film stress adjusting groove 13b may be provided along the edge (groove 14) of the diaphragm 10. A protective film stress adjusting groove 13a corresponds to the protective film stress adjusting groove 13 of FIG. 23. With such a configuration, the detection sensitivity of the diaphragm 10 to a minute pressure change can be increased. In addition, the area of the diaphragm 10 can be reduced.

In the above, the case where the groove 14 is provided in the configuration described in the second preferred embodiment has been described, but the present invention is not limited to this. For example, the groove 14 may be provided in the configuration described in the first preferred embodiment.

Fourth Preferred Embodiment

FIG. 28 is a plan view showing an example of a configuration of a semiconductor pressure sensor according to a fourth preferred embodiment. FIG. 29 is a cross-sectional view taken along the line A1-A2 of FIG. 28. FIG. 30 is a cross-sectional view taken along the line B1-B2 of FIG. 28. Hereinafter, the configuration of the semiconductor pressure sensor according to the fourth preferred embodiment will be described with reference to FIGS. 28 to 30.

The fourth preferred embodiment is characterized in that a diaphragm edge stress adjusting groove 15 (third groove) is provided in the second silicon substrate 4 along the edge of the back surface of the diaphragm 10. Further, the fourth preferred embodiment is characterized in that a dimple 16 is provided in the central region on the back surface of the diaphragm 10. In other words, the second silicon substrate 4 has the diaphragm edge stress adjusting groove 15 provided in the surface on which the first silicon oxide film 2 is provided on the inner periphery of the closed space 3 in a plan view. Further, the second silicon substrate 4 has the dimple 16 provided in the surface on which the first silicon oxide film 2 is provided in the center of the closed space 3 in a plan view. Since other configurations are the same as those in the first preferred embodiment, detailed description thereof will be omitted here.

Next, a forming method for the diaphragm edge stress adjusting groove 15 and the dimple 16 will be described with reference to FIGS. 31 to 35. Regarding the manufacturing method for the semiconductor pressure sensor according to the fourth preferred embodiment, the manufacturing processes other than the process of forming the diaphragm edge stress adjusting groove 15 and the dimple 16 are the same as those of the first preferred embodiment. The manufacturing process shown in FIGS. 31 to 35 corresponds to step S1 of FIG. 4.

First, as shown in FIG. 31, an oxide film 17 and a nitride film 18 are formed in the order on the second silicon substrate 4. The thickness of each of the oxide film 17 and the nitride film 18 is about 50 to 100 nm. After that, a photoengraving process is performed, and only the nitride film 18 is subjected to an etching process using a resist mask (not shown). The diaphragm edge stress adjusting groove 15 and the dimple 16 are formed in openings of the nitride film 18 formed by the etching process in the subsequent process.

Next, as shown in FIG. 32, a LOCOS oxide film 19 is formed by performing an oxidation treatment. The oxide film thickness is about 500 to 1,600 nm. As a result, the openings of the nitride film 18 are locally oxidized, so that the surface layer of the second silicon substrate 4 is also oxidized.

Next, as shown in FIG. 33, the LOCOS oxide film 19, the nitride film 18, and the oxide film 17 are removed by sequentially performing an etching process with hydrogen fluoride (HF) and thermal phosphoric acid. As a result, the diaphragm edge stress adjusting groove 15 and the dimple 16 are formed in the second silicon substrate 4.

Next, as shown in FIGS. 34 and 35, the thick film portion 2*a* and the first thin film portion 2*b* of the first silicon oxide film 2 are formed.

From the above, according to the fourth preferred embodiment, the strength of the diaphragm 10 can be increased by providing the diaphragm edge stress adjusting groove 15 (third groove) in the second silicon substrate 4 along the edge of the back surface of the diaphragm 10. Further, since the edge portion of the diaphragm 10 becomes thin, the detection sensitivity of the diaphragm 10 to a more minute pressure change can be increased. Further, the area of the diaphragm 10 can be reduced, and the size of the semiconductor pressure sensor can be reduced, so that the cost can be reduced.

Further, by providing the dimple 16 in the central region on the back surface of the diaphragm 10, when the diaphragm 10 comes into contact with the first silicon substrate 1 due to excessive pressure or impact applied to the diaphragm 10, the contact area between the diaphragm 10 and the first silicon substrate 1 can be reduced. As a result, sticking between the diaphragm 10 and the first silicon substrate 1 can be prevented.

Since the above effects can be obtained without impairing the effects according to the first preferred embodiment, it is possible to easily obtain a semiconductor pressure sensor that is highly reliable and can detect a minute pressure change with high accuracy.

Within the scope of the present disclosure, each preferred embodiment can be freely combined, and each preferred embodiment can be appropriately modified or omitted.

While the disclosure has been shown and described in detail, the foregoing description is in all aspects illustrative and not restrictive. It is therefore understood that numerous modifications and variations can be devised.

What is claimed is:

1. A semiconductor pressure sensor comprising:
a first silicon substrate;

a first silicon oxide film provided on the first silicon substrate and forming a closed space together with the first silicon substrate;

a second silicon substrate provided on the first silicon oxide film;

a gauge resistor provided on a surface layer of a surface of the second silicon substrate opposite to a surface on which the first silicon oxide film is provided at a position overlapping with the closed space in a plan view;

a first electrode electrically connected to one end of the gauge resistor; and a second electrode electrically connected to another end of the gauge resistor, wherein the first silicon oxide film includes:

a thick film portion having one surface in contact with the first silicon substrate and another surface in contact with the second silicon substrate; and a first thin film portion having one surface facing the first silicon substrate across the closed space and another surface in contact with the second silicon substrate, such that the thick film portion and the first thin film portion are parts of the first silicon oxide film.

2. The semiconductor pressure sensor according to claim 1, further comprising:

a second silicon oxide film provided on the second silicon substrate; and a protective film provided on the second silicon oxide film, wherein the protective film has a first groove provided at a position overlapping with the closed space in a plan view.

3. The semiconductor pressure sensor according to claim 1, wherein the second silicon substrate has a second groove provided in a surface opposite to the surface on which the first silicon oxide film is provided along an outer edge of the closed space in a plan view.

4. The semiconductor pressure sensor according to claim 1, wherein the first silicon oxide film has an opening provided in a center of the first thin film portion.

5. The semiconductor pressure sensor according to claim 1, wherein the first silicon oxide film includes a second thin film portion thicker than the first thin film portion in a center of the first thin film portion.

6. The semiconductor pressure sensor according to claim 1, wherein the second silicon substrate has a third groove provided in the surface on which the first silicon oxide film is provided on an inner periphery of the closed space in a plan view.

7. The semiconductor pressure sensor according to claim 1, wherein the second silicon substrate has a dimple provided in the surface on which the first silicon oxide film is provided in a center of the closed space in a plan view.

* * * * *